April 22, 1969        D. HUGHSON        3,439,785
DIFFERENTIAL LOCK AND AXLE BRAKE
Filed Nov. 14, 1966
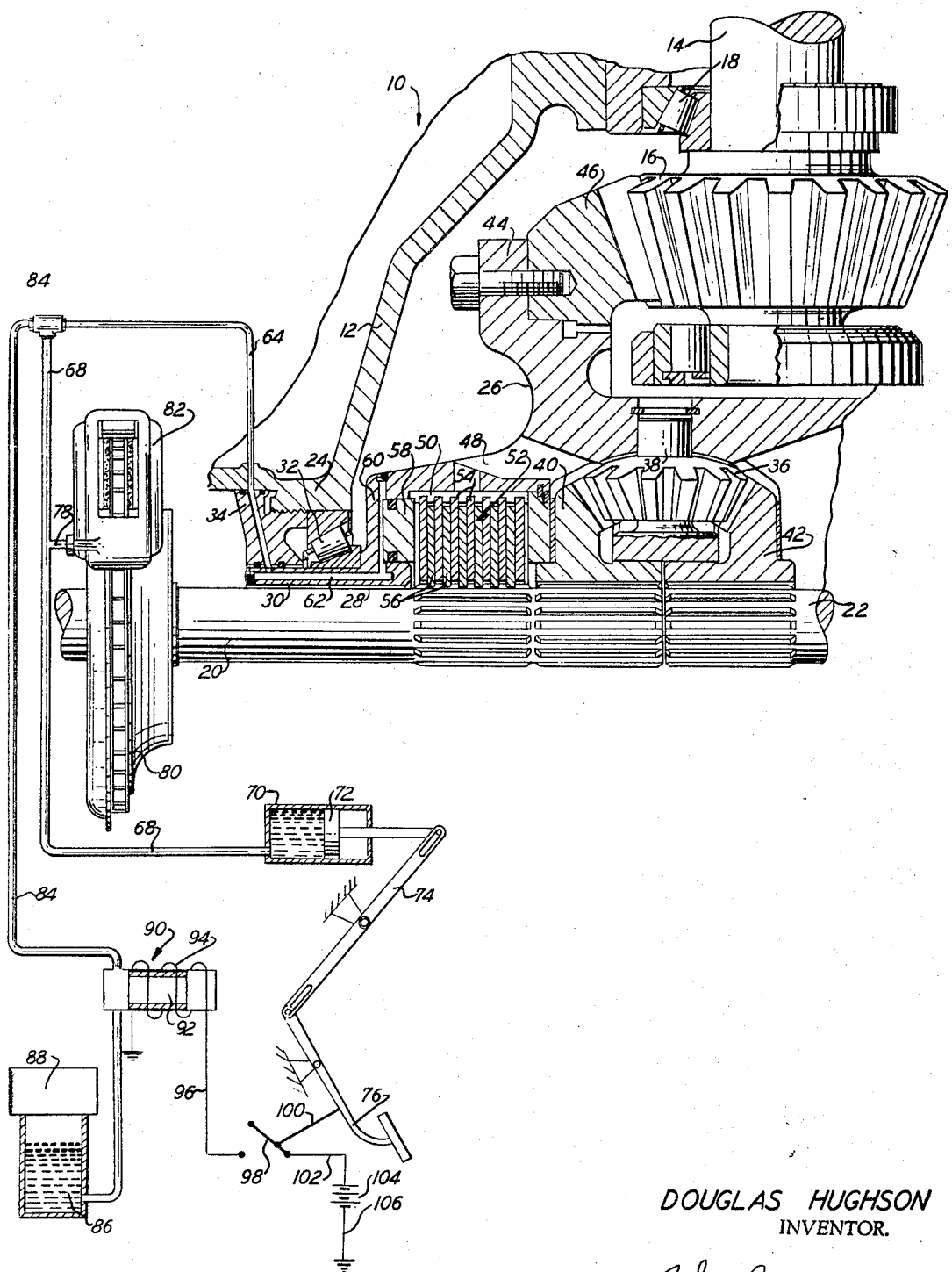
DOUGLAS HUGHSON
INVENTOR.
BY John R. Faulkner
E. Dennis Connor
ATTORNEYS

# United States Patent Office 3,439,785
Patented Apr. 22, 1969

3,439,785
DIFFERENTIAL LOCK AND AXLE BRAKE
Douglas Hughson, Southfield, Mich., assignor to Ford Motor Company, Dearborn, Mich., a corporation of Delaware
Filed Nov. 14, 1966, Ser. No. 593,858
Int. Cl. F16h 57/10
U.S. Cl. 192—4          13 Claims

ABSTRACT OF THE DISCLOSURE

An axle braking system for a motor vehicle having a differential operatively connected to a source of power and a pair of driven half shafts extending from the differential. Means are provided for locking the differential upon the manual actuation of the vehicle brake pedal so that a single brake, acting on one of the half shafts, functions to impede movement of both half shafts.

---

This invention relates to a motor vehicle axle braking system, and in particular to a motor vehicle axle braking system whereby a single brake element acts upon the vehicle axle.

Substantial design simplification and manufacturing cost advantages are obtainable if the conventional wheel brakes currently utilized by motor vehicle wheels connected by a composite axle can be eliminated and a single braking element acting to retard the movement of the axle is used. The necessity of a differential associated with motor vehicle axles requires, however, that a braking system utilizing a single braking element acting on a vehicle axle portion or half shaft be complemented by a device for locking said differential whenever said braking element is operative in order that the braking force exerted by said braking element acts upon both of the differentially rotatable axle portions.

It is, therefore, an object of this invention to provide a braking system for retarding the rotation of vehicle wheels connected by an axle including a single braking element acting upon a portion of said axle.

A further object of this invention is to provide a motor vehicle braking system including a single braking element acting upon a vehicle axle and means for locking the differential associated with said axle whenever said braking element is operative.

A still further object of this invention is to provide an axle braking system for a motor vehicle including means for locking the vehicle differential associated with said axle in unison with the application of the braking element associated with said system.

A braking system constructed in accordance with this invention is utilized in combination with a motor vehicle having a differential, a fluid conduit, and pressure responsive means operatively connected to said fluid conduit differential for locking said differential upon the presence of said predetermined pressure in said fluid conduit. Said braking system includes a reservoir of brake fluid and manual control means having an operative position and an inoperative position for pressurizing fluid in said reservoir to a pressure in excess of said predetermined pressure when said control means are in the operative position. Said fluid conduit operatively connects said reservoir and said pressure responsive means.

Further objects and advantages of this invention will become apparent when the following description is considered in conjunction with the accompanying drawing that illustrates a partial elevation of a motor vehicle differential having parts in section and parts broken away and schemtic illustration of a braking system constructed in accordance with this invention and associated with said differential.

Referring now in detail to the drawing, the numeral 10 denotes a vehicle differential of conventional design having a differential housing 12 through the forward end of which a drive shaft 14 projects, and on the inner end of which there is secured a bevel pinion 16. The shaft 14 is suitably journaled in roller bearings 18 (one shown), as illustrated in the drawing. Coaxial wheel-driving shafts 20 and 22 extend into the interior of housing 12 through oppositely disposed openings defined by the cylindrical portion 24 of housing 12.

A differential cage 26 includes a transverse bore 28 terminating in oppositely disposed cylindrical axially outwardly extending supports or pilot portions 30 that closely surround axial shafts 20 and 22 at points radially inwardly spaced from housing wall portion 24. A plurality of bearing assemblies 32 (one shown) are interposed between the cage pilot portion 30 and the wall portion 24 of the housing 12, thereby supporting the differential cage within the housing. An annular thrust nut 34 is threadedly received within the housing opening to abut the bearing assemblies 32. The usual differential beveled gears 36 (one shown) are rotatably journaled on a spider member 38 secured within the differential cage 26, and engage the face gears 40 and 42 that are splined or otherwise suitably secured to the axle shafts 20 and 22.

The differential cage 26 includes an annular flange 44 to which a ring gear 46 is bolted. As is conventional, ring gear 46 is in mesh with the drive pinion 16 for rotating the differential cage 26 about the axis of the axle shafts 20 and 22.

A web portion 48 of the differential cage 26 has formed therein an annular cavity 50 axially spaced between one of the bearing assemblies 32 and the face gear 40, and opens into the bore 28 of the cage 16 adjacent the axle shaft 20. A multiple disc clutch 52 is disposed within the cavity 50 and includes a plurality of disc elements 54 splined or otherwise secured within the cavity 50 and a plurality of disc elements 56 splined to axle shaft 20. An annular clutch applying piston 58 is journaled in an annular aperture of the wall 60 of the differential cage 26.

Fluid pressure is supplied by means of a drilled passageway 62 formed through the wall of the housing 12, thrust nut 34, cage pilot portion 30 and wall 60 to the clutch applying piston 58. It may be seen that the application of fluid pressure to the clutch piston 58 will lock the clutch elements 54 and 56 thereby locking the differential cage 26 directly to the axle shaft 20. Since the differential cage is operatively connected to the bevel gear 36, and the face gear 40 is secured to the shaft 20 and is in mesh with the differential pinions, the entire differential will be locked thereby supplying power equally through both axle shafts.

Of course the locking of the differential as described above is dependent upon the application of a sufficient magnitude of pressure to clutch applying piston 58. The design of the illustrated differential 10 is such that the locking of said differential will be accomplished upon the application of a definite predetermined pressure to piston 58.

It should be noted that any conventional differential having a pressure sensitive locking device associated therewith may be used in combination with the braking system of this invention. Examples of differentials adapted to be locked by pressure sensitive means that could be used in conjunction with the braking system of this invention are illustrated and described in U.S. Patents 2,913,928 issued Nov. 24, 1959, and 2,991,664, issued July 11, 1961.

The braking system of this invention includes a fluid conduit 64 operatively connected by means of a suitable fitting to passageway 62. The conduit 64 is in turn connected to a conduit 68 that communicates with a brake fluid cylinder 70 that comprises a reservoir for brake fluid. A power piston 72 is slidably received in cylinder 70 and is connected by means of a linkage system 74 to a brake pedal 76 of the motor vehicle. A conduit 78 connects conduit 68 with a disc brake comprising a rotor 80, secured for rotation with axle shaft 20, and caliper 82. It may thus be seen from the drawing that upon the depression of brake pedal 76 by the vehicle operator, the brake fluid in cylinder 70 will become pressurized and this pressure will be transmitted by means of conduits 68 and 78 to the disc brake and by means of conduits 68, 64 and passageway 62 to the clutch applying piston 58.

A conduit 84 interconnects conduit 64 with transmission fluid reservoir 86 of vehicle transmission 88. Operatively arranged in conduit 84 is a solenoid operated valve 90 comprising core 92 and winding 94. The winding 94 is selectively connected by a conductive lead 96 to a switch 98, which in turn is electrically connected by a conductive lead 102 to a current source 104. Current source 104 is electrically connected by a conductive lead 106 to ground. Switch 98 is operated in response to the movement of brake pedal 96 by means of a link 100 so that upon the depression of brake pedal 76, switch 98 will be closed thus completing an electrical circuit from current source 104 to winding 94.

During the normal operation of the motor vehicle, the transmission fluid in reservoir 86 is pressurized but the pressure of the transmission fluid is less than the predetermined pressure necessary to cause a locking of clutch discs 54 and 56. Therefore, although the pressure of the transmission fluid in reservoir 86 is directly applied by means of conduits 84, 64 and passageway 62 to power piston 58, the differential 10 is not locked under these conditions and functions in the normal manner. Upon the depression of the brake pedal 76 by the motor vehicle operator, the switch 98 is closed and the winding 94 of valve 90 becomes energized and core 92 moves to block conduit 84, thus preventing the flow of transmission fluid from the portion of conduit 84 remote from reservoir 86 back to reservoir 86.

As described above, the depression of brake pedal 76 also causes the brake fluid present in brake cylinder 70 to be pressurized, and the pressure of this brake fluid causes the disc brake to become operable. Also, since the pressure of the brake fluid in cylinder 70, when brake pedal 76 is depressed, exceeds the predetermined pressure necessary to cause the locking of the clutch discs 54 and 56, the differential is locked when brake pedal 76 is depressed. Because the transmission fluid present in conduits 84, 64 and passageway 62 has been trapped by the valve 90, the application of the pressure of the brake fluid to the fluid system causes an instantaneous locking of the differential upon the depression of brake pedal 76. Thus the single disc brake is operative to retard the rotation of both axle shafts 20 and 22 immediately upon application of said brake.

It may thus be seen that this invention provides a braking system utilizing but a single braking element that operates to retard the rotation of both half axle shafts associated with the vehicle differential, and that the vehicle differential immediately is locked upon the application of the vehicle brake.

It is to be understood that various changes and modifications may be made to this invention, for example, an accumulator may be connected to the fluid conduit 64 if the pressure generated by piston 72 on the brake fluid in cylinder 70 is insufficient to cause a locking of the differential, without departing from the spirit and scope of the invention as defined by the following claims.

I claim:
1. In combination in a motor vehicle, a differential, a fluid conduit, pressure responsive means operatively connected to said fluid conduit and said differential and locking said differential upon the presence of a predetermined pressure in said fluid conduit, a braking system including a reservoir of brake fluid and manual control means having an operative braking position and an inoperative nonbraking position and pressurizing the fluid in said reservoir to a value in excess of said predetermined pressure when said control means are in the operative position, said fluid conduit operatively connected to said reservoir of brake fluid.

2. The combination of claim 1, including a transmission having a source of pressurized transmission fluid, the pressure of said transmission fluid being less than said predetermined pressure, a second fluid conduit connecting said source of pressurized transmission fluid to said fluid conduit, valve means in said second fluid conduit, said valve means having an open position and a closed position, and valve control means operatively connecting said valve and said manual control means and closing said valve when said control means are in the operative position.

3. The combination of claim 1, wherein said differential includes a pair of half shafts, said braking system further including pressure responsive braking means mounted on one of said half shafts, and a second fluid conduit connecting said braking means and said reservoir.

4. The combination of claim 3, including a transmission having a source of pressurized transmission fluid, the pressure of said transmission fluid being less than said predetermined pressure, a third fluid conduit connecting said source of pressurized transmission fluid to said fluid conduit, valve means in said third fluid conduit, said valve means having an open position and a closed position, and valve control means operatively connecting said valve and said manual control means and closing said valve when said control means are in the operative position.

5. In combination in a motor vehicle, a brake cylinder containing fluid, a pressure responsive brake operatively connected to said cylinder by a fluid conduit, means for pressurizing said fluid in said cylinder, a differential, first means responsive to fluid pressure and secured to said differential for locking said differential, and second means for applying the pressure of the fluid in said cylinder to said first means for locking said differential.

6. In combination in a motor vehicle, a braking system having an operative condition for decelerating said vehicle and an inoperative condition, a differential, locking means having an operative position and an inoperative position secured to said differential and locking said differential when said locking means are in the operative condition, and control means operatively secured to said locking means and sensing the condition of said braking system for forcing said locking means into the operative position when said braking system is the operative condition.

7. The combination of claim 6, wherein said braking system includes a cylinder containing fluid and manual control means for pressurizing said fluid when said system is in said operative condition, said locking means including pressure sensitive means, and a first fluid conduit applying the pressure in said cylinder to said pressure sensitive means.

8. The combination of claim 7, wherein said differential includes a pair of half shafts relatively rotatable when said locking means are in the inoperative position and rotatable in unison when said locking means are in the operative position, a pressure sensitive brake mounted on one of said half shafts, and a second fluid conduit applying the pressure in said cylinder to said brake.

9. The combination of claim 7, including a transmission having a reservoir containing pressurized transmission fluid, a second conduit connecting said reservoir and said first conduit, valve means having an open position and a closed position blocking said second conduit, and switch means responsive to the condition of said system for closing said valve when said system is in the operative condition.

10. The combination of claim 7, wherein said pressure sensitive means include a hydraulic cylinder, a piston slidably mounted in said cylinder, and a multiple disc clutch mounted on said differential and in intimate contact with said piston.

11. The combination of claim 10, wherein said differential includes a pair of half shafts relatively rotatable when said locking means are in the inoperative position and rotatable in unison when said locking means are in the operative position, a pressure sensitive brake mounted on one of said shafts, and a second fluid conduit applying the pressure in said cylinder to said brake.

12. In a motor vehicle, a differential, pressure sensitive locking means secured to said differential and locking said differential upon the application of a predetermined fluid pressure to said locking means, two sources of fluid pressure, one of said sources having a pressure below said predetermined pressure, the other of said sources having a pressure below said predetermined pressure in a first condition and above said predetermined pressure in a second condition, first conduit means connecting said locking means and said other source, second conduit means connecting said one source to said first conduit means, valve means having a closed position blocking said second conduit means and an open position, and control means opening said valve means when said other source is in said first condition and closing said valve means when said other source is in said second condition.

13. The apparatus of claim 12, wherein said first source is a transmission and said second source is a brake cylinder.

References Cited

UNITED STATES PATENTS

| 1,901,276 | 3/1933 | Adams | 74—710.5 |
| 2,913,928 | 11/1959 | Double | 74—710.5 |
| 2,965,181 | 12/1960 | Senkowski | 74—710.5 |
| 2,991,664 | 7/1961 | Bernotas | 188—106 |
| 3,292,720 | 12/1966 | Harvey | 74—710.5 |

FOREIGN PATENTS 739,011   11/1943   Germany.

OTHER REFERENCES

German printed application, 1,026,180, Mar. 13, 1958.

BENJAMIN W. WYCHE III, Primary Examiner.

U.S. Cl. X.R.

74—710.5; 188—152; 192—13